Oct. 30, 1962 S. J. KETTERER 3,060,877
LUBRICATION SYSTEM FOR SEWING MACHINE LOOP TAKER
Filed Feb. 23, 1960
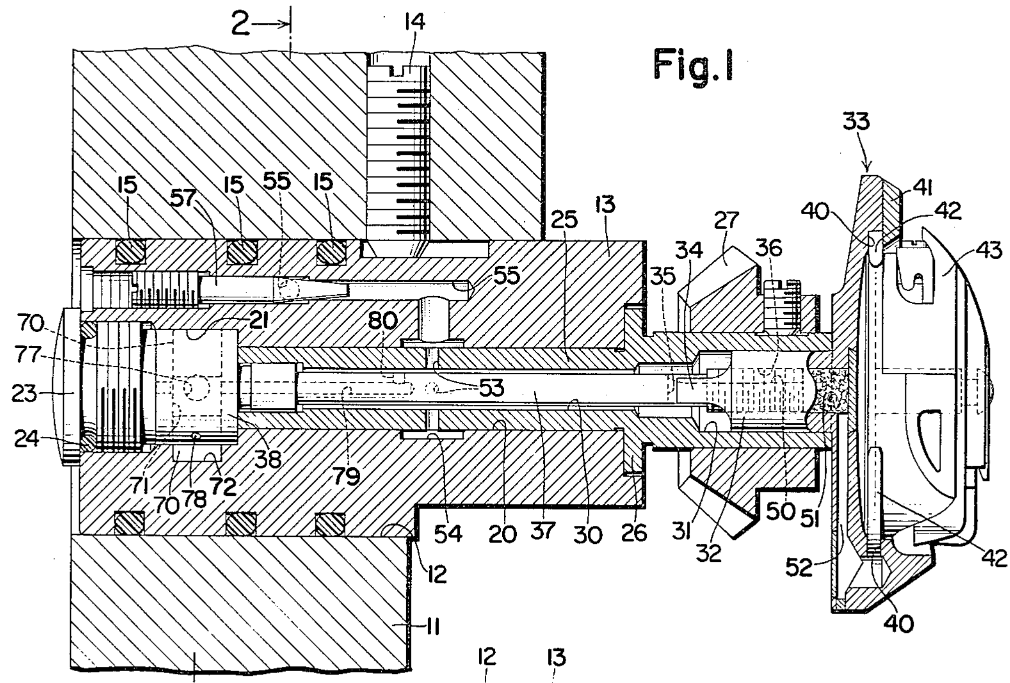
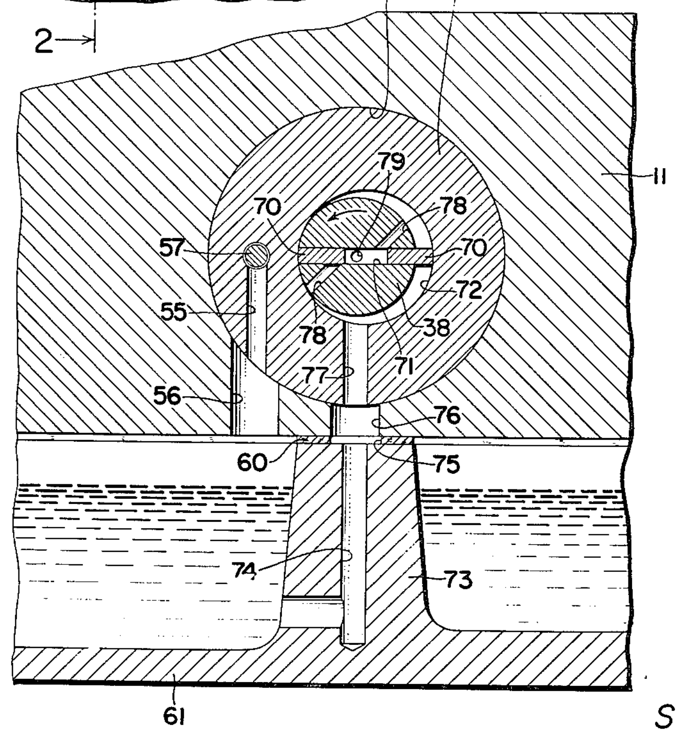
INVENTOR.
Stanley J. Ketterer
WITNESS
William Martin
BY
Marshall J. Breen
ATTORNEY United States Patent Office 3,060,877

Patented Oct. 30, 1962

3,060,877

LUBRICATION SYSTEM FOR SEWING MACHINE LOOP TAKER

Stanley J. Ketterer, Stratford, Conn., assignor to The Singer Manufacturing Company, Elizabeth, N.J., a corporation of New Jersey Filed Feb. 23, 1960, Ser. No. 10,305
6 Claims. (Cl. 112—256)

This invention relates to lock stitch sewing machines having a rotary loop taker in which is journaled a non-rotating thread carrier, and more particularly to a new and improved lubricating system for supplying lubricant to the thread carrier raceway of the loop taker.

It is an object of this invention to provide a novel and improved lubricating system for the thread carrier raceway of the loop taker of a lock stitch sewing machine.

Another object of this invention is to provide a lubrication system for the thread carrier raceway of a loop taker in which the lubricant is delivered under pressure through an axial bore in the loop taker drive shaft by means of a positive displacement pump in which the centrifugal action at high speeds of loop taker rotation augments rather than diminishes the effectiveness of the lubricant distributing system.

Still another object of this invention is to provide a positive displacement pump means for a thread carrier raceway lubricating system in a compact lock stitch loop taker assembly unit which is convenient for manufacture and maintenance of the sewing machine.

Another object of this invention is to provide a lubricating system for the thread carrier raceway of a lock stitch loop taker in which lubricant during the operation of the sewing machine is maintained under positive pressure in the loop taker shaft bore and on the loop taker shaft bearing surfaces to exclude air and foreign matter therefrom.

With the above and additional objects and advantages in view as will be hereinafter apparent, this invention comprises the devices, combinations and arrangements of parts hereinafter described and illustrated in the accompanying drawing of a preferred embodiment in which:

FIG. 1 represents a horizontal cross sectional view of a loop taker assembly unit embodying the features of this invention and including a fragment of the sewing machine casing in which the assembly unit is carried, and FIG. 2 represents a vertical cross sectional view of the entire loop taker assembly unit with the cross section taken substantially along line 2—2 indicated on FIG. 1.

Referring to the drawings, 11 represents a fragment of a sewing machine casing formed with a circular bore 12 adapted snugly to accommodate a bushing 13 of a loop taker assembly. The bushing may be secured in the casing by a set screw 14, and a plurality of packing rings 15 are seated in annular grooves in the bushing to prevent leakage of lubricant between the bushing and the casing bore.

As illustrated in FIG. 1, the bushing 13 is formed with a bore 20 provided at one extremity with a counterbore 21 which is internally threaded at the extremity of the bushing to accommodate a threaded plug 23 which may be provided with a packing ring 24 to seal the exposed extremity of the counterbore and prevent lubricant leakage therefrom. Insertable into the bushing bore 20 from the end opposite the plug 23 is a loop taker shaft 25 formed with an annular flange 26 to seat against the end of the bushing to locate the shaft axially therein. A bevel gear 27 secured fast on the loop taker shaft provides a means whereby the shaft may be driven in one direction of rotation by any known train of loop taker driving connections (not shown). The loop taker shaft is formed with an axial bore 30 which is enlarged, as at 31, at one extremity to accommodate the cylindrical shank 32 of a loop taker 33. The loop taker shank is preferably formed at the free extremity with a tapered tang 34 which seats in a transverse slot 35 formed at the bottom of the bore enlargement 31 to provide a positive rotational interlock between the loop taker shaft and the loop taker.

The loop taker shank is formed with an internally threaded bore 36 which is threadedly engaged by an elongate clamp screw 37 extending loosely through the loop taker shaft bore and formed with an enlarged head 38 accommodated in the bushing counterbore 21. The clamp screw head 38 seats against the loop taker shaft to secure the loop taker axially on the loop taker shaft and also seats against the bottom of the counterbore 21 in the bushing to secure the loop taker shaft axially in the bushing.

The loop taker is preferably of the type referred to in the art as a rotary hook in that it is formed with a thread carrier raceway 40 closed by a gib 41 in which is journaled the bearing rib 42 of a non-rotating thread carrier 43 adapted to accommodate a bobbin of thread (not shown) about which the loop taker carries loops of a needle thread in the formation of lock stitches. As is known in the art of lock stitch formation, a loop taker is driven two revolutions for each reciprocation of the needle. Since sewing speeds in modern lock stitch machines have increased to 5000–6000 stitches per minute, it will be apparent that speeds of 10,000–12,000 r.p.m. commonly occur between the thread carrier raceway 40 and the thread carrier bearing rib 42, giving rise to the need for a dependable supply of lubricant to the raceway. Furthermore, the lubrication requirements at the thread carrier raceway are extremely critical; on the one hand excess lubrication must be avoided in order not to stain and spoil work fabrics, and on the other hand the flow of lubricant, particularly at high speed operation when it is needed most, must not be thwarted by centrifugal forces.

The lubricating system of this invention provides for an advantageous supply of lubricant to the thread carrier raceway which is accurately metered at all speeds of operation and which is dependable to supply the required lubrication continuously at the highest speeds of loop taker operation.

In the loop taker assembly of this invention, the axial bore 30 and the enlarged portion 31 thereof serve as a pressure chamber for lubricant to be supplied to the thread carrier raceway. The threaded portion of the clamp screw 37 is formed with a lengthwise slot 50 providing a lubricant conducting conduit past the threads to a porous plug 51 in the threaded loop taker shank bore 36 which constricts the flow of lubricant into a lubricant conducting conduit 52 formed in the loop taker and extending from the shank bore 36 to the thread carrier raceway 40.

Radial ports 53 formed in the loop taker shaft connect the bore 30 with an annular groove 54 formed in bore 20 of the bushing 13 from which annular groove a lubricant outlet conduit 55 formed in the bushing leads to an aperture 56 formed in the machine casing to drain lubricant from the loop taker shaft bore to a point beneath the machine casing. A valve stem 57 threaded into the bushing serves to constrict the lubricant outlet conduit 55 to provide a valve means operating in concert with the porous plug 51 to control the lubricant pressure in the loop taker shaft bore.

Secured beneath the sewing machine casing and preferably with a gasket 60 interposed therebetween, is a shallow pan 61 providing a lubricant reservoir beneath the aperture 56 in the casing to catch lubricant issuing from the lubricant outlet conduit 55.

In the present invention, lubricant is supplied from the reservoir in the pan 61 to the bore 30 of the loop taker shaft by a positive displacement type pump which, as illustrated in the drawings, comprises a pair of vanes 70 slidable in a radial guide slot 71 formed diametrically across the head 38 of the clamp screw 37. The clamp screw head 38 thus serves as a pump rotor, the vanes being urged radially outwardly by centrifugal force, during rotation of the loop taker shaft, against a raceway 72 formed in the bushing 13 eccentric to the axis of rotation of the pump rotor.

The lubricant containing pan 61 is provided with a partition 73 which is beneath the bushing 13 and formed with a lubricant conduit 74 opening into the pan beneath the level of lubricant therein and extending upwardly into communication with an aperture 75 in the jacket 60, an aperture 76 in the casing and a lubricant inlet conduit 77 which opens into the vane raceway 72 beneath the pump rotor 38.

Upon rotation of the loop taker shaft and pump rotor in the direction illustrated by the arrow in FIG. 2, the vanes 70 disposed one at each side of the rotor, in following the contour of the eccentric vane raceway 72, will be reciprocated in the guideslot 71 and in traversing the space between the pump rotor and the vane raceway will compress lubricant trapped therebetween. The pump rotor 38 is formed with a pair of radial ports 78, one for each of said vanes. The ports 78 communicate exteriorly of the pump rotor with the vane raceway 72, one port in advance of each vane considered in the direction of rotation of the pump rotor. The inner extremity of each of the ports 78 communicates with the guide slot 71 in the path of reciprocation of each respective vane. The vanes thus serve also as valves such that when reciprocated inwardly along the guide slot during the idle or non-pumping portion of each revolution each vane closes off its respective port 78 and when each vane is reciprocated outwardly during the active portion of each revolution and while it is compressing lubricant between the pump rotor and the vane raceway, it opens its respective port to the guide slot 71.

An axial bore 79 formed in the clamp screw and extending from the guide slot 71 to a radial port 80 provides a conduit for the passage of lubricant under pressure from the vane pump to the loop taker shaft bore 30.

The lubricating system of this invention is thus contained within a compact loop taker assembly unit which may be pre-assembled conveniently during manufacture and which is readily accessible for easy maintenance when a sewing machine embodying this invention is in use. Removal of the threaded plug 23 exposes the clamp screw head and pump rotor 38 for quick removal of the only moving parts of the positive displacement pump of this lubricating system.

In effect a two stage pumping action is obtained with the arrangement of this invention. The positive action of the vane type pump delivers lubricant under pressure to the axial bore 79 of the clamp screw. The centrifugal action during rotation of the loop taker then augments this initial pressure of the lubricant when the lubricant passes radial outwardly of the port 80. The arrangement of this invention, therefore, will not diminish in lubricant pressure as the speed of loop taker rotation increases as was true with many prior art systems. Lubricant will thus be delivered to the thread carrier raceway in accurately metered amounts particularly at high sewing speeds when the lubrication is most needed.

A particular advantage of the system of this invention in which positive lubricant pressure is initiated by the positive displacement pump at the innermost point in the system, which pressure is augmented by centrifugal action as the lubricant passes radially outwardly first through the port 80 and then through the ports 53 in the loop taker shaft is that during operation of the loop taker shaft, a positive pressure is maintained between the loop taker shaft 25 and the bushing bore 20 in which the loop taker shaft is journaled. Air, dust, lint and other foreign matter are thus excluded positively from this bearing surface and smoother trouble free operation of the loop taker is attained.

Having thus set forth the nature of the invention, what I claim herein is:

1. In a sewing machine, a rotary loop taker having a thread carrier raceway, a shaft secured for rotation with said loop taker and formed with a longitudinal lubricant conducting bore, means defining a lubricant conducting passageway from said shaft bore to said thread carrier raceway, lubricant pump including means defining a lubricant accommodating chamber and means driven by said shaft for varying the volumetric lubricant capacity of said chamber to change the pressure state of lubricant therein by positive change in displacement, said lubricant pump having an outlet in communication with said shaft bore, said shaft bore having a lubricant escape port, and valve means for regulating the flow of lubricant from said escape port to control lubricant pressure in said shaft bore.

2. In a sewing machine, a bearing having a cylindrical bearing surface, a shaft rotatably journaled in said cylindrical bearing surface having an axial bore, a loop taker carried by said shaft and provided with a thread carrier raceway having lubricant conducting connections with said shaft bore, a pump rotor carried for rotation coaxially with said shaft and formed with a radial guide slot, a vane freely slidable in said guide slot, means housing said pump rotor and formed with a vane raceway which is eccentric to said pump rotor, said pump rotor being formed with conduit means including a radial conduit opening on said vane raceway and an axial conduit communicating with said radial conduit and opening onto said shaft bore for conducting lubricant under pressure from said vane raceway to said shaft bore, said shaft bore having a radial lubricant escape port opening onto said cylindrical bearing surface, and valve means for regulating the flow of lubricant from said escape port to control lubricant pressure on said cylindrical bearing surface and in said shaft bore.

3. A loop taker assembly unit for a sewing machine, comprising, a bushing formed with a lubricant inlet conduit and a lubricant outlet conduit, a shaft having a longitudinal bore journaled in said bushing, a loop taker carried by said shaft and provided with a thread carrier raceway having lubricant conducting connections with said shaft bore, a pump rotor carried for rotation with said shaft within said bushing and formed with a radial guide slot, a vane freely slidable in said slot, said bushing formed with a vane raceway which is eccentric to said pump rotor and communicating with said lubricant inlet conduit, conduit means extending from said vane raceway to said shaft bore, an escape port in said shaft extending from said shaft bore to said lubricant outlet conduit in said bushing, and valve means for regulating the flow of lubricant in said outlet conduit to control the lubricant pressure in said shaft bore.

4. A loop taker assembly unit for a sewing machine, comprising, a bushing formed with a lubricant inlet conduit and a lubricant outlet conduit, a shaft having a longitudinal bore journaled in said bushing, a loop taker carried by said shaft and provided with a thread carrier raceway having lubricant conducting connections with said shaft bore, a pump rotor carried for rotation with said shaft within said bushing and formed with a guide slot extending diametrically across said rotor, an axial lubricant conducting conduit formed in said rotor leading from said guide slot to said shaft bore, a pair of vanes freely slidable in said guide slot one on each side of the axis of turning movement of said rotor, said bushing formed with a vane raceway which is eccentric to said pump rotor and communicating with said lubricant inlet conduit, said rotor being formed with a pair of lubricant inlet ports extending from said guide slot to a point on the outside surface of said pump rotor each port in advance of a respective one of said vanes considered in the direction of rotation of said pump rotor, an escape port in said shaft extending from said shaft bore to said lubricant outlet conduit in said bushing, and valve means for regulating the flow of lubricant in said outlet conduit to control the lubricant pressure in said shaft bore.

5. A loop taker assembly unit for a sewing machine, comprising, a bushing formed with a lubricant inlet conduit and a lubricant outlet conduit, a shaft having a longitudinal bore journaled in said bushing, means for rotating said shaft in one direction, a loop taker carried by said shaft and provided with a thread carrier raceway having lubricant conducting connections with said shaft bore, a pump rotor carried for rotation with said shaft within said bushing and formed with at least one guide slot extending diametrically across said rotor, a pair of vanes slidably confined in said guide slot one at each side of said rotor, said bushing being formed with a vane raceway in communication with said lubricant inlet conduit, said vane raceway being eccentric to said pump rotor causing said vanes to reciprocate radially in said guide slot during rotation of said shaft, said pump rotor being formed with a pair of radial ports one for each of said vanes, said ports communicating with said vane raceway one port in advance of each vane respectively considered in the direction of rotation of said shaft and communicating with said guide slot one port in the path of reciprocation of each respective vane, a lubricant conduit formed in said pump rotor leading from said guide slot to said shaft bore, an escape port in said shaft extending from said shaft bore to said lubricant outlet conduit in said bushing, and valve means for regulating the flow of lubricant in said outlet conduit to control the lubricant pressure in said shaft bore.

6. A loop taker assembly unit for a sewing machine comprising, a bushing formed with a through bore with a counterbore at one end, a lubricant inlet conduit communicating with said counterbore and a lubricant outlet conduit communicating with said bore, a hollow shaft formed with a flange insertable into said bushing bore from the end opposite the counterbore, a loop taker carried at one end of said shaft for rotation therewith and provided with a thread carrier raceway having lubricant conducting connections with the interior of said hollow shaft, an elongate loop taker clamp screw insertable through said bushing counterbore and said hollow shaft into threaded engagement with said loop taker, an enlarged head formed on said loop taker clamp screw seated in said counterbore, a pair of vanes radially slidable in said clamp screw head, an eccentric vane raceway formed in said counterbore, lubricant conducting passageways formed in said clamp screw and communicating with vane raceway and with the interior of said hollow shaft, means in the lubricant conducting connections between the loop taker thread carrier raceway and the interior of said hollow shaft for constricting the flow of lubricant therein to establish lubricant pressure in said hollow shaft during rotation thereof, and adjustable valve means in the lubricant outlet conduit of said bushing for controlling the lubricant pressure in said shaft bore during rotation of said shaft.

References Cited in the file of this patent

UNITED STATES PATENTS

| | | |
|---|---|---|
| 1,102,288 | Myers | July 7, 1914 |
| 1,965,388 | Ott | July 3, 1934 |
| 2,346,139 | Myers | Apr. 11, 1944 |
| 2,441,942 | Van Ness | May 18, 1948 |
| 2,447,987 | Parry | Aug. 24, 1948 |
| 2,653,549 | Knight | Sept. 29, 1953 |